United States Patent
Hattori et al.

(10) Patent No.: US 8,353,172 B2
(45) Date of Patent: Jan. 15, 2013

(54) CONTROL DEVICE, METHOD, AND PROGRAM OF PERMANENT-MAGNET TYPE SYNCHRONOUS MOTOR

(75) Inventors: Makoto Hattori, Aichi (JP); Masahiko Asai, Aichi (JP); Takayuki Takashige, Aichi (JP); Koji Nakano, Aichi (JP); Takashi Nakagami, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 786 days.

(21) Appl. No.: 12/525,580

(22) PCT Filed: May 18, 2007

(86) PCT No.: PCT/JP2007/060244
§ 371 (c)(1),
(2), (4) Date: Aug. 3, 2009

(87) PCT Pub. No.: WO2008/142756
PCT Pub. Date: Nov. 27, 2008

(65) Prior Publication Data
US 2010/0064706 A1 Mar. 18, 2010

(51) Int. Cl.
*F25B 49/00* (2006.01)
*H02H 7/09* (2006.01)
*H02P 6/20* (2006.01)
(52) U.S. Cl. ........ 62/157; 62/230; 318/400.22; 318/700
(58) Field of Classification Search .................... 62/157, 62/230; 318/400.22, 477, 700
See application file for complete search history.

(56) References Cited

U.S. PATENT DOCUMENTS

| | | | |
|---|---|---|---|
| 6,858,968 B2 * | 2/2005 | Takita et al. | 310/261.1 |
| 2004/0159115 A1 | 8/2004 | Matsunaga et al. | |
| 2005/0052146 A1 | 3/2005 | Someya | |
| 2007/0035272 A1 | 2/2007 | Hattori et al. | |
| 2009/0237020 A1 * | 9/2009 | Sakai | 318/400.11 |
| 2011/0056226 A1 * | 3/2011 | Okubo et al. | 62/208 |
| 2011/0062908 A1 * | 3/2011 | Kitanaka | 318/400.22 |

FOREIGN PATENT DOCUMENTS

| | | |
|---|---|---|
| EP | 1515423 A2 | 3/2005 |
| EP | 1753124 A2 | 2/2007 |
| JP | 02-123995 A | 5/1990 |
| JP | 2001204192 A | 7/2001 |
| JP | 2003028073 A | 1/2003 |

(Continued)

OTHER PUBLICATIONS

International Search Report of PCT/JP2007/060244, mailed on Aug. 7, 2007.

(Continued)

*Primary Examiner* — Marc Norman
(74) *Attorney, Agent, or Firm* — Westerman, Hattori, Daniels & Adrian, LLP

(57) ABSTRACT

There is provided a control device of a permanent-magnet type synchronous motor that sets a synchronous operation current at start-up in response to a current limiting value determined from the temperature of an inverter that supplies three-phase power to the permanent-magnet type synchronous motor, that monitors an output voltage or an output current of the inverter during a rotation stabilizing period after start-up, and that updates the synchronous operation current using this output voltage or output current.

9 Claims, 10 Drawing Sheets

FOREIGN PATENT DOCUMENTS

| | | |
|---|---|---|
| JP | 2003-348883 A | 12/2003 |
| JP | 2004-104895 A | 4/2004 |
| JP | 2005083316 A | 3/2005 |
| JP | 2005-223991 A | 8/2005 |
| JP | 2007056725 A | 3/2007 |
| JP | 2007151318 A | 6/2007 |

OTHER PUBLICATIONS

Japanese Office Action dated Dec. 1, 2009, issued in corresponding Japanses Patent Application No. 2005-343421.

\* cited by examiner

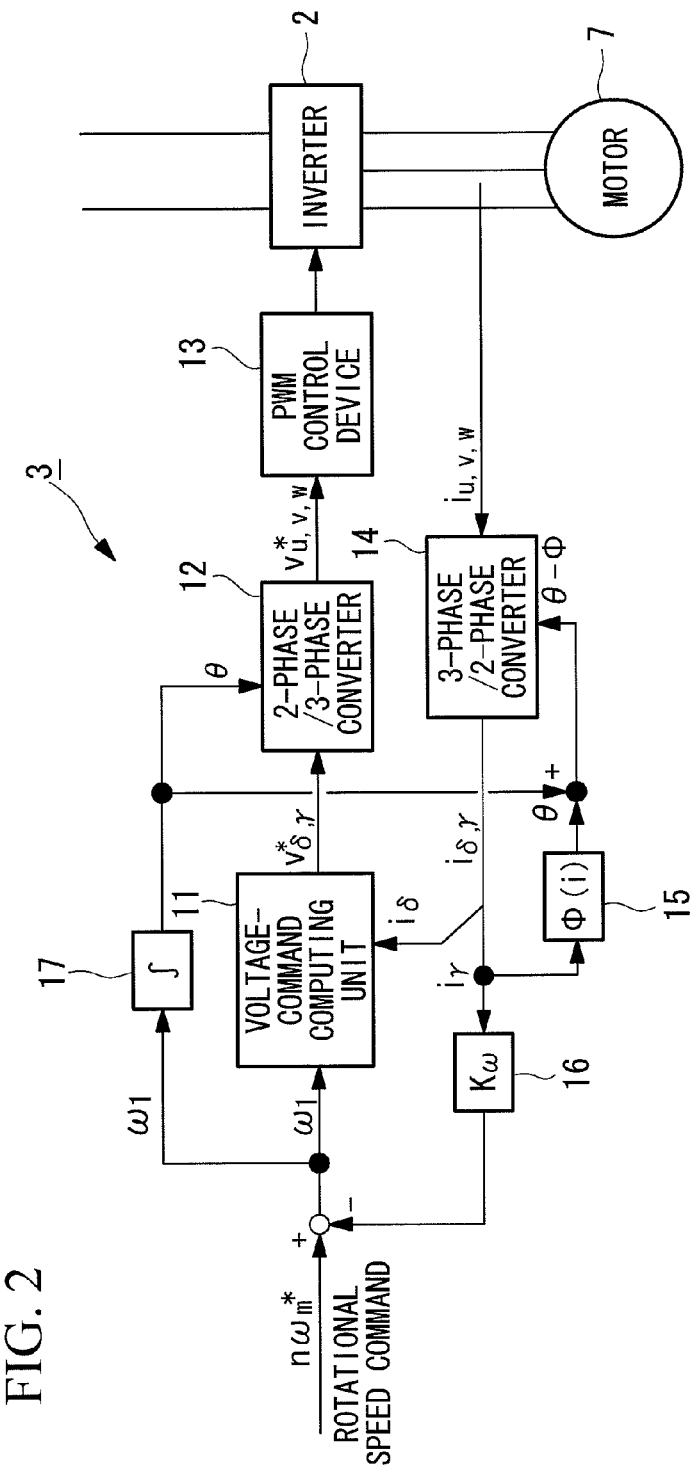

FIG. 2

$\omega_m^*$ : ROTATIONAL SPEED COMMAND, n : NUMBER OF PAIRS OF POLES,
$\omega 1$ : INVERTER OUTPUT FREQUENCY
$v^*\delta, v^*\gamma$ : $\delta$ AXIS AND $\gamma$ AXIS VOLTAGE COMMAND,
$v^*u, v^*v, v^*w$ : U PHASE, V PHASE, AND W PHASE VOLTAGE COMMANDS,
iu, iv, iw : U PHASE, V PHASE, AND W PHASE CURRENTS,
$i\delta, i\gamma$ : $\delta$ AXIS AND $\gamma$ AXIS CURRENTS,
$\theta$ : OUTPUT VOLTAGE PHASE, $\phi$ : POWER FACTOR ANGLE

CONTROL DEVICE, METHOD, AND PROGRAM OF PERMANENT-MAGNET TYPE SYNCHRONOUS MOTOR

TECHNICAL FIELD

The present invention relates to the control of a permanent-magnet type synchronous motor used as a driving source of a compressor provided in a vehicle air conditioner.

BACKGROUND ART

Electric compressors used in vehicle air conditioners realize a cooling function by compressing refrigerants with the rotational force transmitted from built-in or connected permanent-magnet type synchronous motors. For the control of motors in such electric compressors, control employing a position sensor, such as a Hall element, cannot be carried out because the interior accommodating the motor is soaked with lubricant; therefore, so-called sensorless control is typically carried out.

In sensorless control of a permanent-magnet type synchronous motor, synchronized operation cannot be carried out immediately because the rotor position at start-up of the electric motor is unknown. Thus, conventionally, a three-phase voltage (current) for rotating the rotor at a constant speed in a particular direction for a particular amount of time is output to the motor to forcibly start it up (for example, refer to Patent Document 1).

Patent Document 1:
Japanese Unexamined Patent Application, Publication No. 2003-28073

DISCLOSURE OF INVENTION

However, as described above, when carrying out control by unilaterally applying a constant current without knowing the condition of the compressor that works in conjunction with the motor, the possibility of start-up failure increases. When considering an electric compressor as a product, it is preferable to eliminate, as much as possible, start-up failures. In particular, since hybrid vehicles, FCEVs, HEVs, etc., drive their wheels with fixed batteries used as power sources, it is required to avoid, as much as possible, power consumption due to start-up failure of electric compressors using the same power source.

It is an object of the present invention to provide a control device, method, and program that enable smooth start-up of a permanent-magnet type synchronous motor used for driving a compressor of a vehicle air conditioner.

To solve the above-described problems, the present invention provides the following solutions.

A first aspect of the present invention is a control device of a permanent-magnet type synchronous motor used as a driving source of a compressor of a vehicle air conditioner, including a current setting unit configured to set a synchronous operation current at start-up in response to a current limiting value determined from the temperature of an inverter that supplies three-phase power to the permanent-magnet type synchronous motor; and a current updating unit configured to monitor an output voltage or an output current of the inverter during a rotation stabilizing period after start-up and to update the synchronous operation current using this output voltage or output current.

According to such a configuration, the synchronous operation current at start-up is set in response to the current limiting value determined from the temperature of the inverter supplying a three-phase current to the permanent-magnet type synchronous motor; therefore, at start-up, an overcurrent can be prevented from being applied to the inverter. Moreover, by setting a current having a value as close as possible to the current limiting value, the start-up success rate of the permanent-magnet type synchronous motor can be increased.

Furthermore, since the output voltage or the output current of the inverter during the rotation stabilizing period is monitored after start-up, these values can be used to estimate the motor loads. Then, after start-up, by updating the above-described synchronous operation current to a suitable current value taking into consideration these motor loads, it is possible to reduce power consumption and realize efficient motor driving.

Furthermore, according to the above-described configuration, so long as the configuration is capable of acquiring the temperature of the inverter, it is possible to set the synchronous operation current at start-up; therefore, there is no need to acquire sensor information from the motor, the compressor, and so on. In this way, the device configuration can be simplified.

In the control device of a permanent-magnet type synchronous motor, the current setting unit may determine the current limiting value in response to a temperature characteristic of a switching device included in the inverter.

According to such a configuration, the current limiting value is determined on the basis of the temperature characteristic of the switching device, which is a main component of the inverter. In this way, it is possible to prevent deterioration and damage of the switching device due to an overcurrent. The switching device is, for example, a power transistor or the like.

The control device of the permanent-magnet type synchronous motor may further include a computing unit configured to compute a liquefaction determining value for determining whether or not a refrigerant in the compressor is liquefied, using the output voltage or output current of the inverter during the rotation stabilizing period; and a determining unit configured to determine whether or not the liquefaction determining value exceeds a liquefaction reference value, wherein the current updating unit may carry out updating of the synchronous operation current when the liquefaction determining value does not exceed the liquefaction reference value.

According to such a configuration, after start-up, the liquefaction determining value for determining whether or not the refrigerant in the compressor is liquefied on the basis of the output voltage or the output current of the inverter during the rotation stabilizing period. When this liquefaction determining value does not exceed the liquefaction reference value, updating of the synchronous operation current is carried out by the current updating unit. In this way, when the refrigerant in the compressor is not liquefied, efficient operation of the motor is realized by the synchronous operation current updated by the current updating unit. In contrast, when the refrigerant in the compressor is liquefied, operation corresponding to the liquefaction is carried out.

The rotation stabilizing period is a period in which the rotational speed of the motor stabilizes and can be set appropriately. For example, it is when the rotational speed is between 10 rps and 15 rps.

The control device of a permanent-magnet type synchronous motor is, in particular, installed in electric vehicles, such as fuel cell electric vehicles (FCEVs) and hybrid electric vehicles (HEVs), and is suitable for use in air conditioners driven by a battery power source. In other words, the control device of a permanent-magnet type synchronous motor according to the present invention is capable of smoothly starting a motor because its start-up success rate is high. In this way, power loss due to start-up failure can be reduced; therefore, it is suitable for use in electric vehicles, etc., which are likely to be affected by power loss at start-up.

The control device of a permanent-magnet type synchronous motor may include a voltage-command computing unit configured to set a voltage command proportional to the frequency of the motor based on two axes of a rotating rectangular coordinate system; a 2- phase/3-phase converter configured to carry out coordinate transformation of the two-axis voltage command to three phases; a PWM control unit configured to apply the three-phase voltage command to the motor after power conversion by the inverter; a feedback unit configured to feedback the motor terminal current, without detecting the magnetic field direction of the motor; a power-factor-angle determining unit configured to determine the power factor angle from the feedback current; and a power-factor-angle adding/subtracting unit configured to add or subtract the power factor angle to or from the rotational angle used when transforming the motor terminal current obtained in three-phase to an orthogonal coordinate.

The voltage-command computing unit is equivalent to, for example, the voltage- command computing unit 11 shown in FIG. 2; the 2-phase/3-phase converter is equivalent to, for example, the 2-phase/3-phase converter 12; the PWM control device is equivalent to, for example, the PWM control device 13; the power-factor-angle computing unit is equivalent to, for example, the power-factor-angle computing unit 15; and the power-factor-angle adding/subtracting unit is equivalent to, for example, the 3-phase/2-phase converter 14.

A second aspect of the present invention is a control method of a permanent-magnet type synchronous motor used as a driving source of a compressor of a vehicle air conditioner, including a current setting step of setting a synchronous operation current at start-up in response to a current limiting value determined from the temperature of an inverter that supplies three-phase power to the permanent-magnet type synchronous motor; and a current updating step of monitoring an output voltage or an output current of the inverter during a rotation stabilizing period after start-up and updating the synchronous operation current using this output voltage or output current.

In the current setting step in the control method for a permanent-magnet type synchronous motor, the current limiting value may be determined in response to a temperature characteristic of a switching device included in the inverter.

The control method for a permanent-magnet type synchronous motor may further include a computing step of computing a liquefaction determining value for determining whether or not a refrigerant in the compressor is liquefied, using the output voltage or output current of the inverter during the rotation stabilizing period; and a determining step of determining whether or not the liquefaction determining value exceeds a liquefaction reference value, wherein, in the current updating step, updating of the synchronous operation current may be further carried out when the liquefaction determining value does not exceed the liquefaction reference value.

A third aspect of the present invention is a control program for controlling a permanent-magnet type synchronous motor used as a driving source of a compressor of a vehicle air conditioner, the control program causing a computer to execute current setting processing for setting a synchronous operation current at start-up in response to a current limiting value determined from the temperature of an inverter that supplies three-phase power to the permanent-magnet type synchronous motor; and current updating processing for monitoring an output voltage or an output current of the inverter during a rotation stabilizing period after start-up and updating the synchronous operation current using this output voltage or output current.

In the control program for a permanent-magnet type synchronous motor, the current setting processing may determine the current limiting value in response to a temperature characteristic of a switching device included in the inverter.

The control program for a permanent-magnet type synchronous motor may further include computing processing for computing a liquefaction determining value for determining whether or not a refrigerant in the compressor is liquefied, using the output voltage or output current of the inverter during the rotation stabilizing period; and determining processing for determining whether or not the liquefaction determining value exceeds a liquefaction reference value, wherein the current updating processing may further update the synchronous operation current when the liquefaction determining value does not exceed the liquefaction reference value.

According to the present invention, an advantage is provided in that start-up of a permanent-magnet type synchronous motor used for driving a compressor in a vehicle air conditioner can be carried out smoothly.

DESCRIPTION OF DRAWINGS

FIG. 1 is a block diagram illustrating the system configuration according to an embodiment of the present invention.

[FIG. 2] FIG. 2 illustrates functional blocks of a control device shown in FIG. 1. FIG. 3 is a graph illustrating the relationship between a d axis current and a q axis current for a minimum current, where the vertical axis is the d axis current and the horizontal axis is the q axis current.

FIG. 4 is a graph illustrating the relationship between current and phase difference for a minimum current, where the vertical axis is the phase difference and the horizontal axis is the current.

FIG. 5 is a graph illustrating the relationships between current and torque for unity-power-factor control and for the present invention, where the vertical axis is the phase difference and the horizontal axis is the torque.

FIG. 6A is a flow chart illustrating the control procedure carried out, at start up, in the control device according to a first embodiment of the present invention.

FIG. 6B is a flow chart illustrating the control procedure carried out, at start up, in the control device according to the first embodiment of the present invention.

FIG. 7 is a flow chart illustrating the control procedure carried out, at start up, in the control device according to the first embodiment of the present invention.

FIG. 8 is a graph illustrating the relationship between the temperature of a power transistor and a current limiting value for a minimum current, where the vertical axis is the current limiting value and the horizontal axis is the temperature.

FIG. 9A is a flow chart illustrating the control procedure carried out, at start up, in the control device according to a second embodiment of the present invention.

EXPLANATION OF REFERENCE SIGNS

Figure 1:
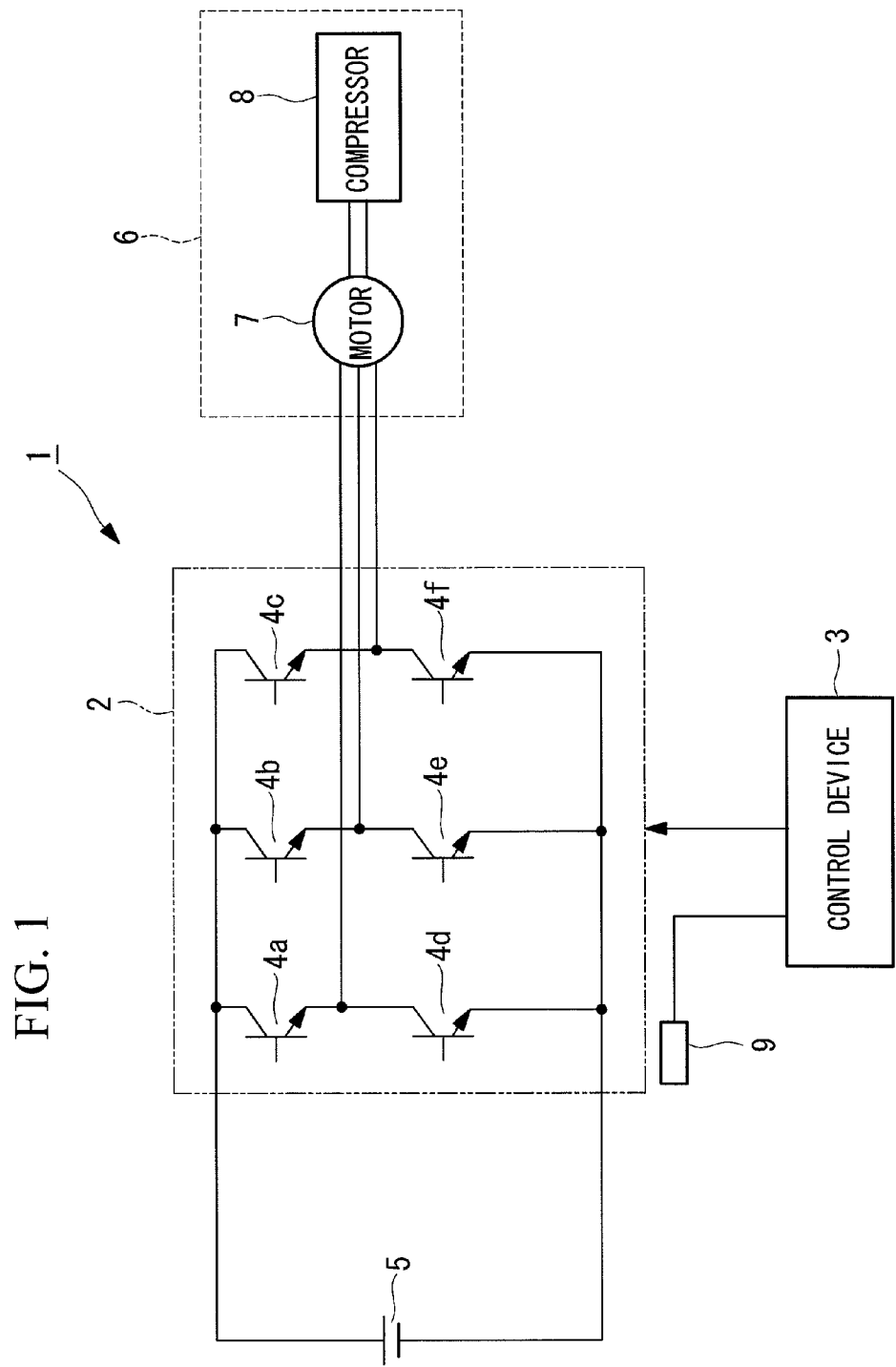
[FIG. 1]

1: drive control device of electric compressor
2: inverter
3: control device
4a to 4f: power transistors
5: battery
6: electric compressor 7: motor
8: compressor
9: temperature sensor
11: voltage-command computing unit
12: 2-phase/3-phase converter
13: PWM control device
14: 3-phase/2-phase converter
15: power-factor-angle computing unit
16: proportionator
17: integrator

BEST MODE FOR CARRYING OUT THE INVENTION

Embodiments of the present invention will be described below with reference to the drawings.

First, a control device and a control method of a permanent-magnet type synchronous motor in normal operation will be described with reference to FIGS. 1 to 5; then, a control method related to the present invention at start up will be described with reference to FIGS. 6A to 9B.

FIG. 1 illustrates, in outline, the configuration of a drive control device of an electric compressor employing the control device of a permanent-magnet type synchronous motor according to this embodiment. In FIG. 1, a drive control device 1 of an electric compressor includes an inverter 2 and a control device (control device of a permanent-magnet type synchronous motor) 3.

The inverter 2 includes six power transistors 4a to 4f. By controlling the ON and OFF states of the six power transistors 4a to 4f with the control device 3, the DC voltage supplied from a battery 5 installed in a vehicle is converted into a rectangular-pulse-train three-phase pseudo-AC voltage and is supplied to a motor 7 provided in an electric compressor 6. The control device 3 acquires respective sensor detection information from the inverter 2, the motor 7, and so on and carries out control of the inverter 2 on the basis of this information. The control method realized by the control device 3 will be described below.

The motor 7 is, for example, a sensorless type brushless motor and has a stator constructed of a coil wound around a yoke and a rotor having a permanent magnet. The rotor is driven by being connected to a compressor 8 of the electric compressor 6. Compression of the refrigerant is realized by transmitting the driving force of the motor 7 to the compressor 8.

The torque τ of such a permanent-magnet type synchronous motor is usually represented by the following Equation (1).

[Formula 1]

$$\tau = n \Lambda_d i_q + n(L_d - L_q) i_d i_q \quad (1)$$

Here, $\Lambda_d$ represents the induced voltage coefficient, and $i_d$ and $i_q$ represent the armature currents of the d axis and the q axis, respectively. $L_d$ and $L_q$ represent the inductances of the d axis and the q axis, respectively, and n represents the number of pairs of poles. Note that, the d axis is an axis provided in the direction of the magnetic field of the motor rotor, and the q axis is an axis extending from the d axis in a direction in which the phase is shifted by 90 degrees.

The first term of Equation (1) represents the torque (magnet torque) generated by the q axis current flowing in a direction orthogonal to the direction of the magnetic field due to the magnet. The second term of the equation represents the torque (reluctance torque) generated when the reluctances differ in the d axis direction and the q axis direction. With a surface permanentmagnet motor (SPM) in which $L_d = L_q$, the second term can be ignored. Even for an interior permanent-magnet motor (IPM), if the difference between $L_d$ and $L_q$ is small, the second term is often ignored.

Returning to FIG. 1, reference numeral 9 represents a temperature sensor that detects the temperature of the inverter 2. A current sensor (not shown) is provided to detect the current supplied from the inverter 2 to the motor 7. The sensor detection values thereof are transferred to the control device 3 at predetermining timings.

FIG. 2 illustrates a functional block diagram of the control device 3. As shown in FIG. 2, the control device 3 includes a voltage-command computing unit 11, a 2-phase/3-phase converter 12, a PWM control device 13, a 3-phase/2-phase converter 14, a power-factor-angle computing unit 15, a proportionator 16, and an integrator 17.

In FIG. 2, $\omega_m$ represents the rotational speed command; n represents the number of pairs of poles in the motor; $\omega_1$ represents the inverter output frequency (primary frequency); Vδ* and Vγ* represent the δ axis and γ axis voltage commands, respectively; $v_u^*$, $v_v^*$, and $v_w^*$ represent the voltage commands in the u phase, v phase, and w phase, respectively; $v_u$, $v_v$, and $v_w$ represent the output voltages in the u phase, v phase, and w phase, respectively; $i_u$, $i_v$, and $i_w$ represent the output currents in the u phase, v phase, and w phase, respectively; and $i_δ$ and $i_γ$ represent the inverter output currents of the δ axis and γ axis, respectively, where $i_δ$ represents the exciting current component and $i_γ$ represents the torque current component. θ represents the output voltage phase, and φ represents the power factor angle.

The control device 3 is composed of, for example, a central processing unit (CPU), a read only memory (ROM), a random access memory (RAM), and so on, which are not shown in the drawings. The series of processing procedures for realizing the functions of the above-described units is recorded on a recording medium in a program format readable by a computer. By reading out this program by the CPU to the RAM etc. and performing processing and computing of the information, the functions of the above-described units, such as the voltage-command computing unit 11, are realized.

The recording medium readable by a computer is, for example, a magnetic disk, a magneto-optical disk, a CD-ROM, a DVD-ROM, or a semiconductor memory.

In FIG. 2, the voltage-command computing unit 11 determines the δ axis voltage command Vδ* and the γ axis voltage command Vγ* through the computation of the following equations (2-1) and (2-2) using the δ axis current $i_δ$ obtained by carrying out 3-phase/2-phase conversion of the currents $i_u$, $i_v$, and $i_w$ in the three detected phases u, v, and w, the inverter output frequency $\omega_1$, the proportionality constant K, the induced voltage coefficient $\Lambda_d$ of the d axis, and the proportionality gain K.

[Formula 2]

$$v^*_δ = -K_δ i_δ \quad (2\text{-}1)$$

[Formula 3]

$$v^*_γ = \Lambda_d \omega_1 - K \int i_δ dt \quad (2\text{-}2)$$

The control corresponding to when the voltage-command computing unit 11 is set as in the Equations (2-1) and (2-2) will be described below. First, to aid understanding, a case when the power factor angle φ(i) is zero will be described. Since φ represents the power factor angle, when the phase difference of the voltage applied to the motor 7 and the current thereof is zero, the power factor represented by cos ω equals one. Therefore, this control is so-called unity-power-factor control.

In the voltage command computation according to Equations (2-1) and (2-2), for example, if the γ axis voltage command Vγ* is smaller than the motor terminal voltage, the inverter output current $i_\delta$ of the δ axis will be a negative value in order to weaken the magnetic field.

In contrast, if Vγ* is large, the magnetic field is strengthened in response, and $i_\delta$ becomes a positive value.

Specifically, in the computation of Equation (2-1), the δ axis voltage command carries out negative proportionality control such that the δ axis current $i^\delta$ becomes zero. In this way, if $i_\delta$ fluctuates in the positive and negative directions, the voltage command Vδ* is determined to quickly eliminate the fluctuation in $i_\delta$ by the gain $K_\delta$.

Here, the γ axis voltage command Vγ* carries out integration control for integrating $i_\delta$ to set a voltage value that compensates the voltage of $\Lambda_d \omega_1$ equivalent to an induced voltage and to carry out computation for setting the δ axis current $i_\delta$ to zero. In other words, in the computation of Equation (2-2), when the δ axis current $i_\delta$ accumulates to either a positive or negative value, a voltage value is determined such that it returns to the original state by a larger value. Here, although integration control is used, depending on the control response, proportional control, proportional integration control, etc. may be used.

In this way, $i_\delta$ is set to zero, and when $i_\delta$ is set to zero, $V_\delta$ is also set to zero. As a result, since the current applied to the motor 7 and the voltage applied to the motor contain only the γ axis component, the phases match, and the power factor equals one. With this alone, the product of the voltage and the current is minimized, and power-saving control is possible.

However, with a permanent-magnet type synchronous motor, since the reluctance torque represented by the second term of Equation (1) can also be used, the current can be reduced even more by using both the magnet torque and the reluctance torque in good balance. When a motor current (absolute value combining the δ axis and the γ axis) I flows at an advance angle θ with respect to the induced voltage, the d axis current $i_d$ and the q axis current $i_q$ can be represented by Equations (3-1) and (3-2), respectively.

[Formula 4]

$$i_d = -I \sin \theta \tag{3-1}$$

[Formula 5]

$$i_q = -I \cos \theta \tag{3-2}$$

The condition for the motor torque τ to be maximized with respect to the motor current I is that the derivative of τ (Equation (4-1)) with respect to θ, obtained by substituting Equations (3-1) and (3-2) into Equation (1), be zero. This is represented by the following Equation (4-2).

[Formula 6]

$$\tau = n\Lambda_d I \cos\theta \cdot n(L_d - L_q) \cdot I^2 \cdot \sin\theta \cdot \cos\theta \tag{4-1}$$

[Formula 7]

$$d\tau/d\theta = -n \cdot \Lambda_d \cdot I \sin\theta - n(L_d - L_q) \cdot I^2 \cdot (\cos^2\theta - \sin^2\theta) = 0 \tag{4-2}$$

The following Equation (5) is obtained when I·sin θ and I·cos θ of Equation (4-2) are represented by $i_d$ and $i_q$ of Equations (3-1) and (3-2).

[Formula 8]

$$\Lambda_d \cdot i_d + (L_d - L_q)(i_d^2 - i_q^2) = 0 \tag{5}$$

Figure 3:
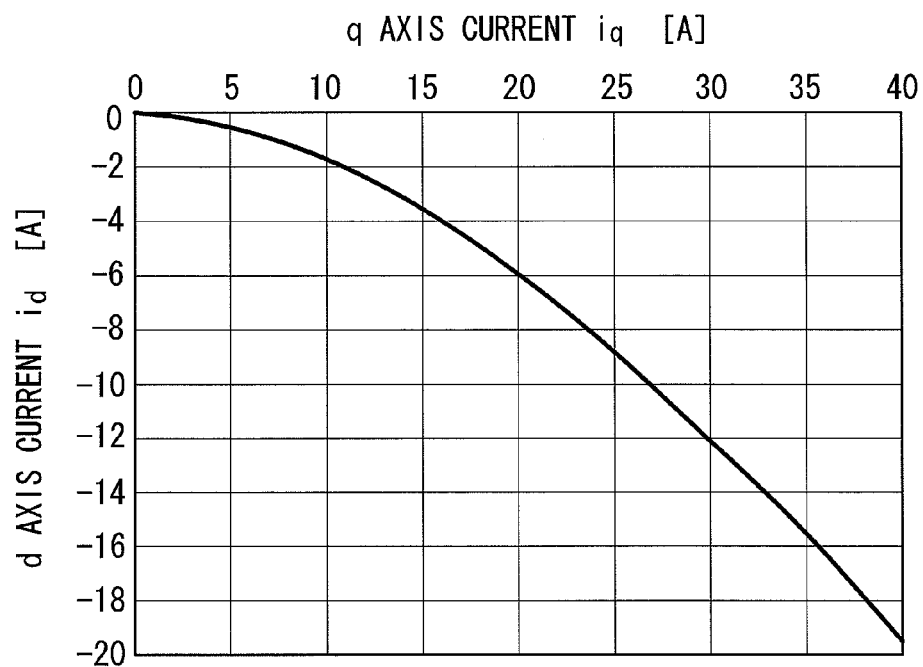
[FIG. 3]

Equation (5) represents the relationship $(i_d+A)^2 - i_q^2 = A^2$ where $A = \Lambda_d/2(L_d - L_q)$, and its graph is shown in FIG. 3 where $i_d$ is the vertical axis and $i_q$ is the horizontal axis.

Accordingly, the drawing represents the combination of $i_d$ and $i_q$ that obtains a minimum current. However, since the relationship of $i_d$ and $i_q$ includes square roots, to use this for control, a method such as tabulation is required.

Therefore, the inventors changed their point of view and carried out extensive investigation on carrying out control based on the phase difference of the motor current I and the voltage V applied to the motor. First, since φ is the difference of the phase of the voltage V applied to the motor and the phase of the motor current I, it can be represented by the following Equation (6).

[Formula 9]

$$\phi = \tan^{-1}(-v_d/v_q) - \tan^{-1}(i_d/i_q) \tag{6}$$

As described above, the relationship between id and $i_q$ for a minimum current is $(i_d+A)^2 - i_q^2 = A^2$. Since this is a hyperbolic curve, it can be represented by hyperbolic functions (sinh and cosh) in the following Equations (7-1) and (7-2).

[Formula 10]

$$i_d = A(\cos h\alpha - 1) \tag{7-2}$$

[Formula 11]

$$i_q = A \sin h\alpha \tag{7-2}$$

When α is sufficiently small such that it can be regarded as zero, approximations $i_d = A\alpha^2$ and $i_q = \alpha$ are possible. Vd and Vq, which are the voltages applied to the motor corresponding to the d axis and the q axis, can be regarded as the following Equations (8-1) and (8-2) on the basis of the equality expression for the motor circuit. This is because resistance can be ignored at normal operation rotational speed.

[Formula 12]

$$v_d = -n\omega_m L_q i_q \approx -\omega_m L_q A\alpha \tag{8-1}$$

[Formula 13]

$$v_q = n\omega_m L_d i_d + \Lambda_d n\omega_m \approx \Lambda_d n\omega m \tag{8-2}$$

By using these equations, the phase difference (1) of Equation (6) can be approximated by the following Equation (9)

[Formula 14]

$$\phi = \tan^{-1}(-v_d/v_q) - \tan^{-1}(-i_d/i_q) \approx \tan(\phi) \\ = (-v_d i_q + v_q i_d)/(v_q i_q - v_d i_d) \approx (L_q A/\Lambda_d + 1/2) \cdot \alpha \tag{9}$$

Here, since the current I can be represented by the following Equation (10), as a result, the phase difference φ can be represented by the following Equation (11). In other words, the phase difference φ has a substantially proportional relationship with the current. Since, $i_\delta = 0$ as a result of the control, and I is proportional to $i_\gamma$, the phase difference φ is also proportional to $i_\gamma$.

Figure 4:
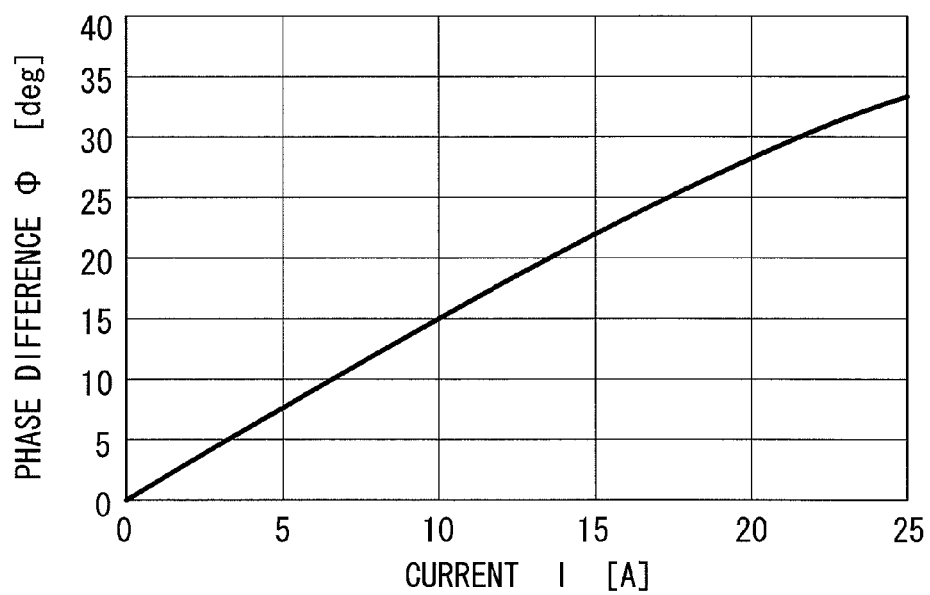
[FIG. 4]

The relationship between the phase difference φ and the current I obtained through plotting by using the d axis current and the q axis current without carrying out the above-described approximation is shown in FIG. 4. Even in this way, it is substantially proportional, thus indicating the validity of the control using the proportional relationship.

[Formula 15]

$$I=\sqrt{i_d^2+i_q^2/3} \approx A\alpha/\sqrt{3} \qquad (10)$$

[Formula 16]

$$\phi=\sqrt{3}\{L_d/\Lambda_d+1/(2A)\}\cdot I \qquad (11)$$

In this way, the control of the minimum current required for obtaining torque can be realized, not by φ=0, but by actively controlling the power factor angle (phase difference). Accordingly, in this embodiment, as shown in FIG. 2, a power-factor-angle adding/subtracting unit that sets the rotational axis used for 3-phase/2-phase conversion of the current of the motor terminal to θ−φ, not θ, is provided. Since τ is a function of the current I, I is determined using the fed-back γ axis current, as shown in the drawing (i_δ is controlled to zero). Once I is determined, it is multiplied by a constant to determine φ. In this way, φ is subtracted from the rotational axis θ of the 3-phase/2-phase conversion.

Then, the current 3-phase/2-phase-converted by setting the rotational axis to θ−φ is multiplied by the gain Kφ9 to negatively feed it back to the speed command nω_m*, which is the frequency, and the command nω_m* is corrected such that the synchronous motor operates stably. In this way, stability is achieved by correcting the speed command since the current increases when the load increases and the position of the rotor is delayed with respect to the rotating magnetic field and since, in contrast, the current decreases when the load is reduced and the position of the rotor advances with respect to the rotating magnetic field. According to Equations (2-1) and (2-2), since control is carried out such that Vδ=I_δ=0, if the phases used for 3-phase/2-phase conversion of the current and 2-phase/3-phase conversion of the voltage differ, control is carried out such that the power factor angle is set to p, which is the difference thereof.

Since the relationship between the current I and the phase difference φ is a proportional relationship, φ may be determined through computation by selecting an appropriate proportionality constant, or, if accuracy is required within a large range of current values, the relationship between I and φ may be provided as a table. There is a merit in that even when a table configuration is employed, the table data does not have to be provided in detail because of the substantially proportional relationship. Even in this way, unlike referring to a two-dimensional table, which is combinations of i_δ and i_γ, I is obtained through actual feedback; therefore, φ can be uniquely determined, and an appropriate phase difference φ can always be determined.

Figure 5:
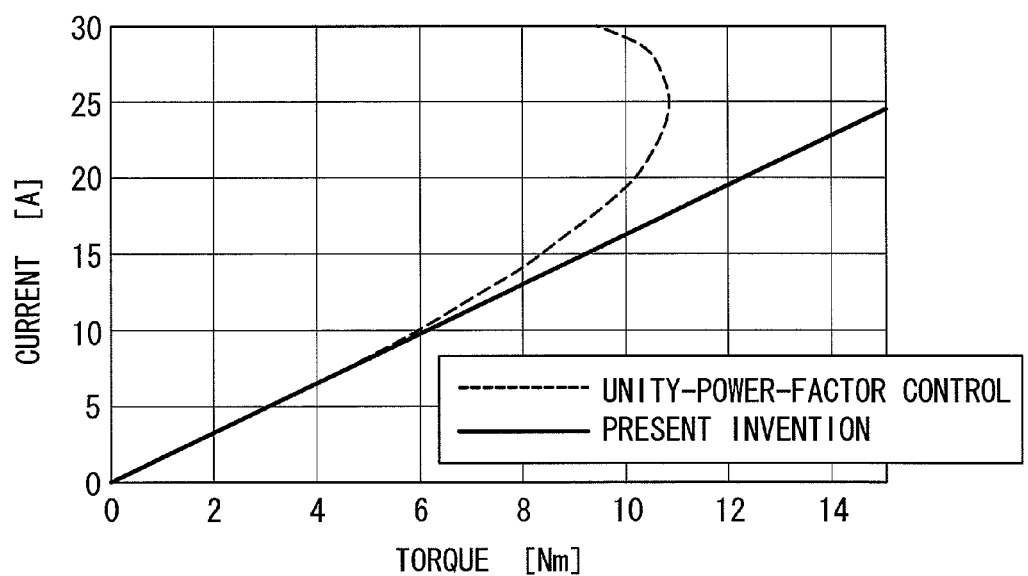
[FIG. 5]

As described above, during normal operation, the torque of the permanent-magnet type synchronous motor is controlled by a minimum current that takes into consideration the reluctance torque of the permanent-magnet type synchronous motor. Since torque control by a minimum current is possible without complicated computation and by merely changing the rotational axis angle for 3-phase/2-phase conversion, the configuration becomes simple, and maintainability is improved. Moreover, in this embodiment, as shown in FIG. 5, compared to when unity-power-factor control is carried out, the torque range in which V/f control becomes appropriate is expanded, and operation with the current minimized based on simple V/f control from low rotational speed to high rotational speed becomes possible.

By carrying out control as described above, it is possible to contribute to size reduction of industrial products and electric power savings. For example, motors for compressors of air conditioners, as well as requiring size reduction, have an exceptionally strong need for power saving because air conditioners are equipment that consumes a large amount of electricity. Increasing use of permanent-magnet type synchronous motors is one fact that reflects this. However, if the present invention enables provision of minimum-current control in a compact configuration, the above-described needs can be met.

Next, a control method carried out at start up of a motor by the above-described control device of a permanent-magnet type synchronous motor, which is characteristic of the present invention, will be described.

As described above, a control device according to this embodiment determines an output voltage and frequency on the basis of a motor-rotational-speed command, not a motor load during normal operation, and drives a motor such that optimal characteristics are obtained during rated operation. However, with such control method, driving is difficult because stability is lost at low rotational speed, for example, during start up, when the load cannot be ignored. Thus, at start up, instead of the above-described V/F control, a constant synchronous operation current is supplied to the motor, regardless of the position of the rotor of the motor and the magnitude of the motor load, and depending of the subsequent condition, the synchronous operation current is set appropriately.

Figure 6A:
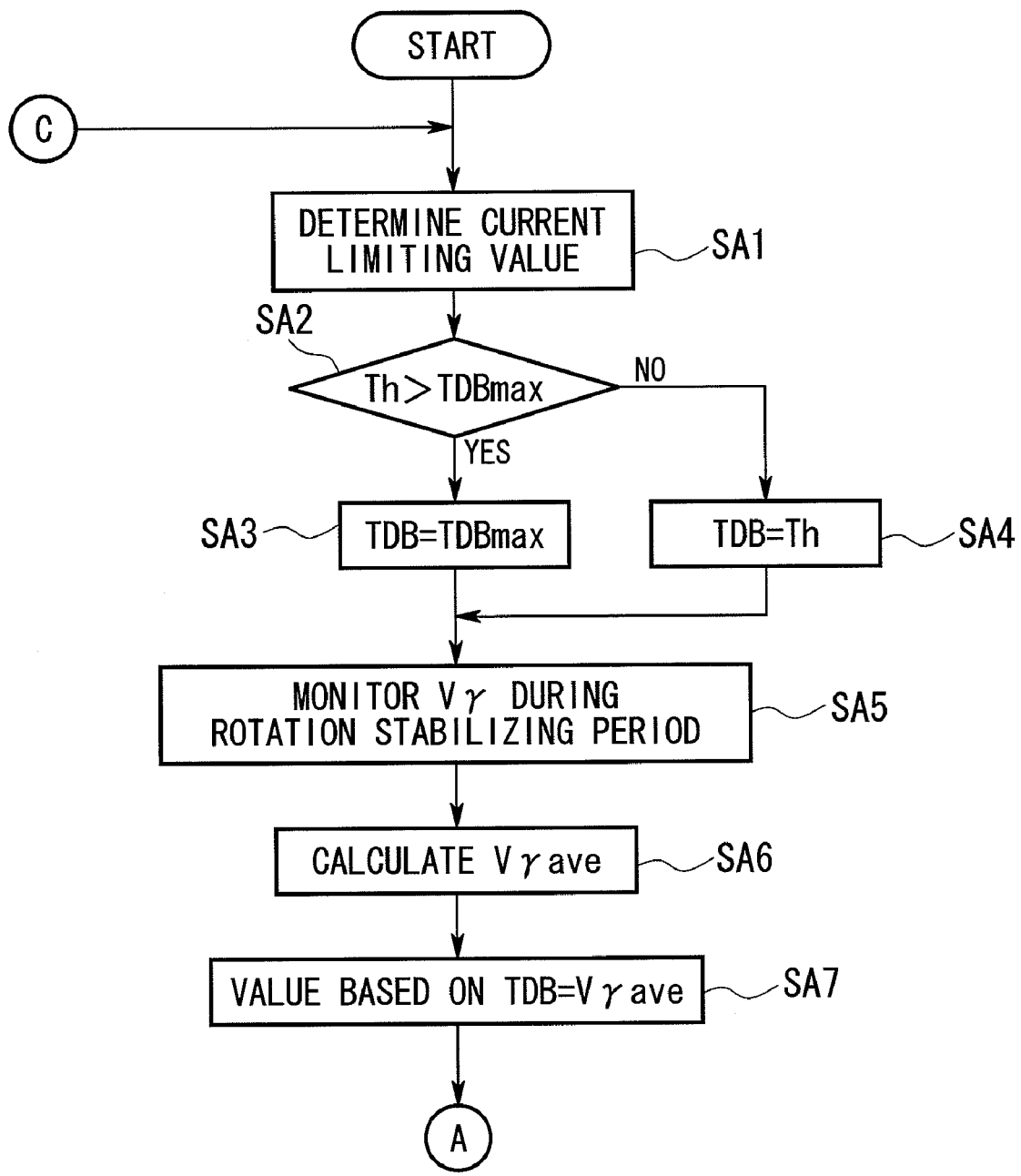
[FIG. 6A]

The control procedure of the control device 3 at start-up will be described below with reference to FIGS. 6A to 7. The process illustrated in FIGS. 6A to 7 is, for example, realized by the voltage-command computing unit 11 shown in FIG. 2. In other words, in this embodiment, the voltage-command computing unit 11 has respective functions realized by a current setting unit, a current updating unit, a computing unit, and a determining unit according to the present invention. Specifically, the functions of the voltage-command computing unit 11 and processing, such as synchronous current setting and updating thereof, are realized by executing a control program described below, which is equivalent to the functions realized by the voltage-command computing unit 11, on the CPU built in the control device 3.

Figure 8:
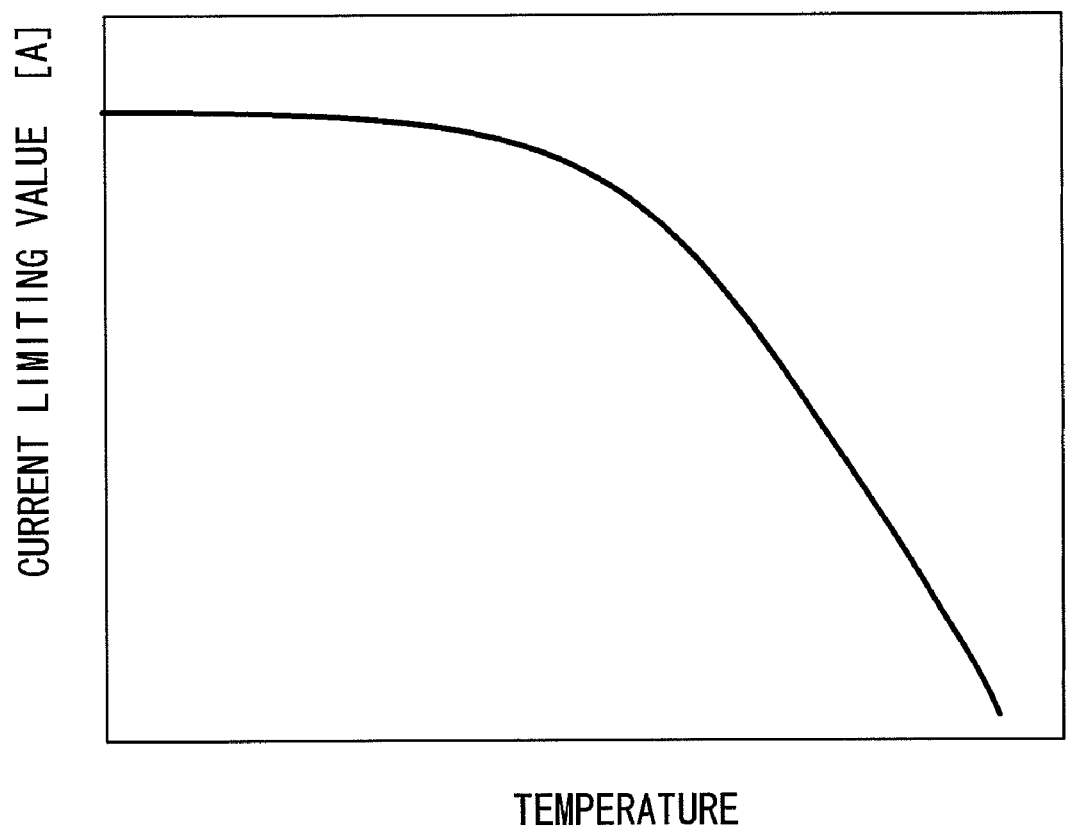
[FIG. 8]

First, when a start-up command is sent from a higher order computer, the voltage-command computing unit 11 determines the present current limiting value on the basis of the temperature of the inverter 2 (Step SA1 in FIG. 6A). This current limiting value is a value determined in response to the characteristics and temperatures of the power transistors 4a to 4f provided for the inverter 2. For example, as shown in FIG. 8, the voltage-command computing unit 11 is provided, in advance, with a table linking inverter temperatures and current limiting values. By referring to this table, the current limiting value corresponding to the temperature at start-up is determined. Here, the higher the temperature is, the lower the set current limiting value is. Instead of the above-described table, the current limiting value may be determined through computation using a function expression in which temperature is a variable.

For the temperature of the inverter 2, it is possible to use a sensor value transferred from the temperature sensor 9.

Subsequently, the voltage-command computing unit 11 calculates an overcurrent determining value Th by further subtracting a predetermined value (for example, one of the values from 3 A to 7 A or, more preferably, 5 A) from the determined current limiting value and then determines whether or not this overcurrent determining value Th exceeds a predetermined synchronous operation limiting current TBDmax (Step SA2).

If, as a result, the overcurrent determining value Th exceeds the synchronous operation limiting current TDBmax, the synchronous operation limiting current TDBmax is set as a synchronous operation current TDB at start-up (Step SA3). In contrast, if the overcurrent determining value Th is smaller or equal to the synchronous operation limiting current TDBmax, the overcurrent determining value Th is set as the synchronous operation current TDB (Step SA4). The processing process from Steps SA1 to SA4 is equivalent to the current setting processing according to the present invention.

Subsequently, the voltage-command computing unit 11 determines the δ axis voltage command $V_δ^*$ and the γ axis voltage command $V_γ^*$ on the basis of the set synchronous operation current TDB and outputs them to the 2-phase/3-phase converter 12. (see FIG. 2). In this way, control of the inverter 2 based on these voltage commands is carried out by PWM, and the synchronous operation current TDB is supplied to the motor 7 via the inverter 2. The motor 7 starts to rotate upon supply of the synchronous operation current TDB and gradually increases its rotational speed until the rotational speed stabilizes at that corresponding to the synchronous operation current TDB.

During a rotation stabilizing period when the rotational speed of the motor 7 is stabilized (for example, the period when the rotational speed is between 10 rps and 15 rps), the voltage-command computing unit 11 monitors the γ axis terminal voltage Vγ and, when the rotational speed reaches 15 rps, calculates the average value Vγave of the γ axis terminal voltage Vγ during this rotation stabilizing period (Step SA6). Then, based on this average value Vγave, the synchronous operation current is updated (Step SA7). More specifically, when the average value Vγave of the γ axis terminal voltage Vγ is smaller than or equal to a reference value Vref for start-up load determination (for example 28.6 V), the synchronous operation current is set to a value lower than the previously set synchronous operation current, for example, 35 A. In contrast, when the average value Vγave exceeds the reference value Vref for start-up load determination, it is updated to the current limiting value. The processing process from Steps SA5 to SA7 is equivalent to the current updating steps according to the present invention. The reference value Vref for start-up load determination is a value empirically settable to an arbitrary value. In this embodiment, it is set to a value that minimizes start-up failure on the basis of the average value Vγave.

In this way, when the synchronous operation current is updated, subsequently, it is determined whether or not start-up failure has occurred (Step SA8 in FIG. 6B). In this processing, for example, it is determined whether or not an overcurrent is applied to the circuit of the inverter and whether or not a command such as an emergency stop for notifying malfunction of the vehicle in which the air conditioner is installed is generated.

If, as a result, it is determined in Step SA8 that start-up failure has not occurred, subsequently, it is determined whether or not the compressor is operating normally (Step SA9). Specifically, it is determined whether or not the maximum value Imax (hereinafter referred to as "current maximum value") of the inverter-output-current absolute value when a predetermined amount of time elapses after the inverter output reaches a value equivalent to the required rotational speed is larger than an abnormality determining value Iref. Here, the abnormality determining value Iref depends on the type and size of the motor 7 and the type and size of the compressor 8 and is set to a current value that yields the minimum torque of the motor 7, within the operating condition of the compressor 8, for example, a current value with a magnitude of approximately 3 A.

If, as a result, the current maximum value Imax is smaller than or equal to the abnormality determining value Iref, it is determined that the compressor 8 is operating normally, and the operation gradually shifts to steady operation (Step SA10). In other words, the operating state of the motor 7 smoothly shifts to the above-described V/F control while gradually adjusting the control amount from control at start-up to control during steady operation.

In contrast, in Step SA9, if the current maximum value Imax larger than the abnormality determining value Iref, it is determined that there is an abnormality in the operation of the compressor 8, the output to the inverter 2 is stopped (Step SA11), and then after a predetermined amount of time elapses (Step SA12), the process goes to Step SA17 shown in FIG. 7.

Next, if it is determined that start-up failure has occurred in the above-described Step SA8, inverter damage determination is carried out (Step SA13). If, as a result, there is an abnormality in the inverter 2, the driving of the motor 7 is stopped by stopping the driving of the inverter 2, and furthermore, an abnormality is reported to the user by notifying the higher order computer of the occurrence of an abnormality (Step SA14). In contrast, if it is determined that no damage is caused to the inverter 2, after a predetermined about of time elapses (Step SA15), it is determined whether or not the processing from the above-described Steps SA1 to SA15 has been repeated a predetermined number of times (for example, three times) (Step SA16). If, as a result, it has not been repeated the predetermined number of times, the process returns to the above-described Step SA1 (see FIG. 6A), and the processing from Step SA1 is repeated through the above-described procedure.

Figure 6B:
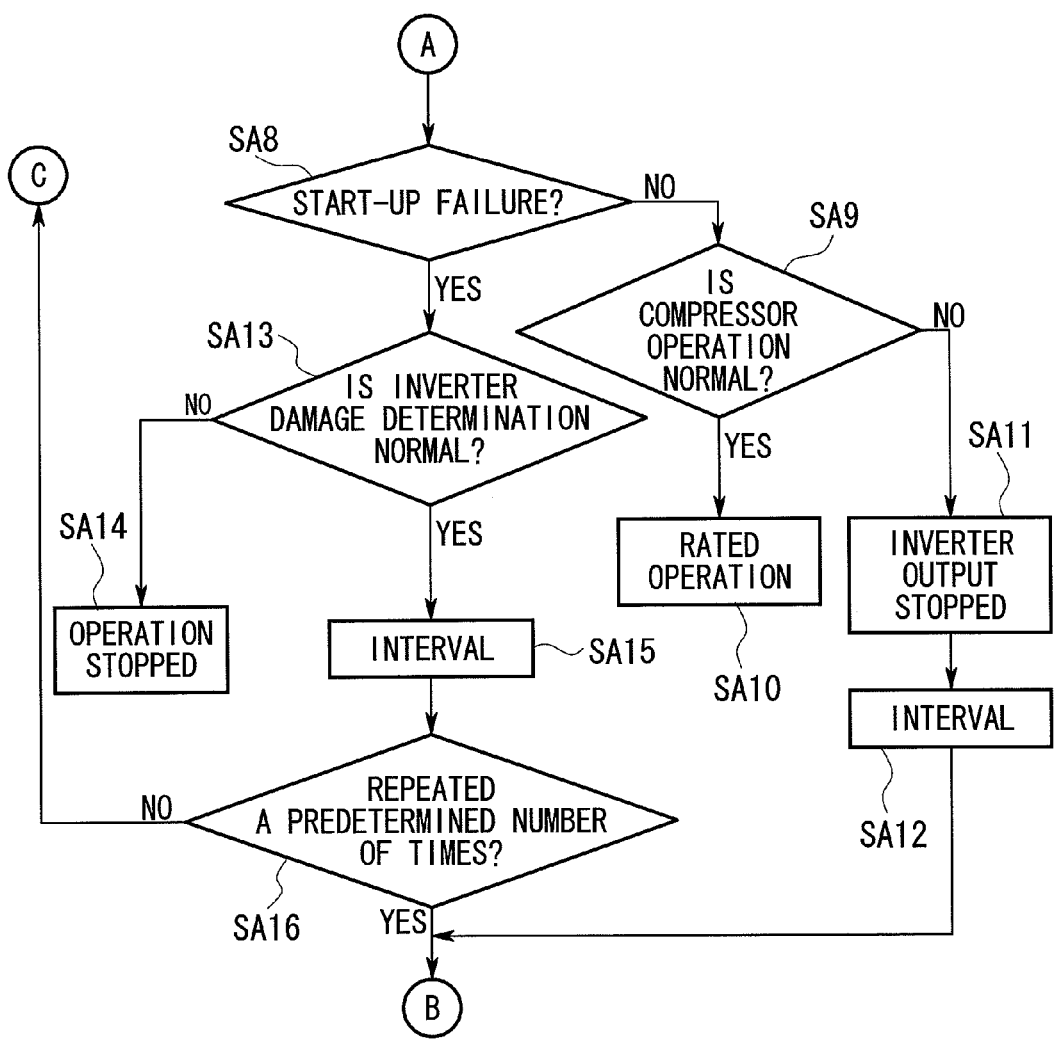
[FIG. 6B]
Figure 7:
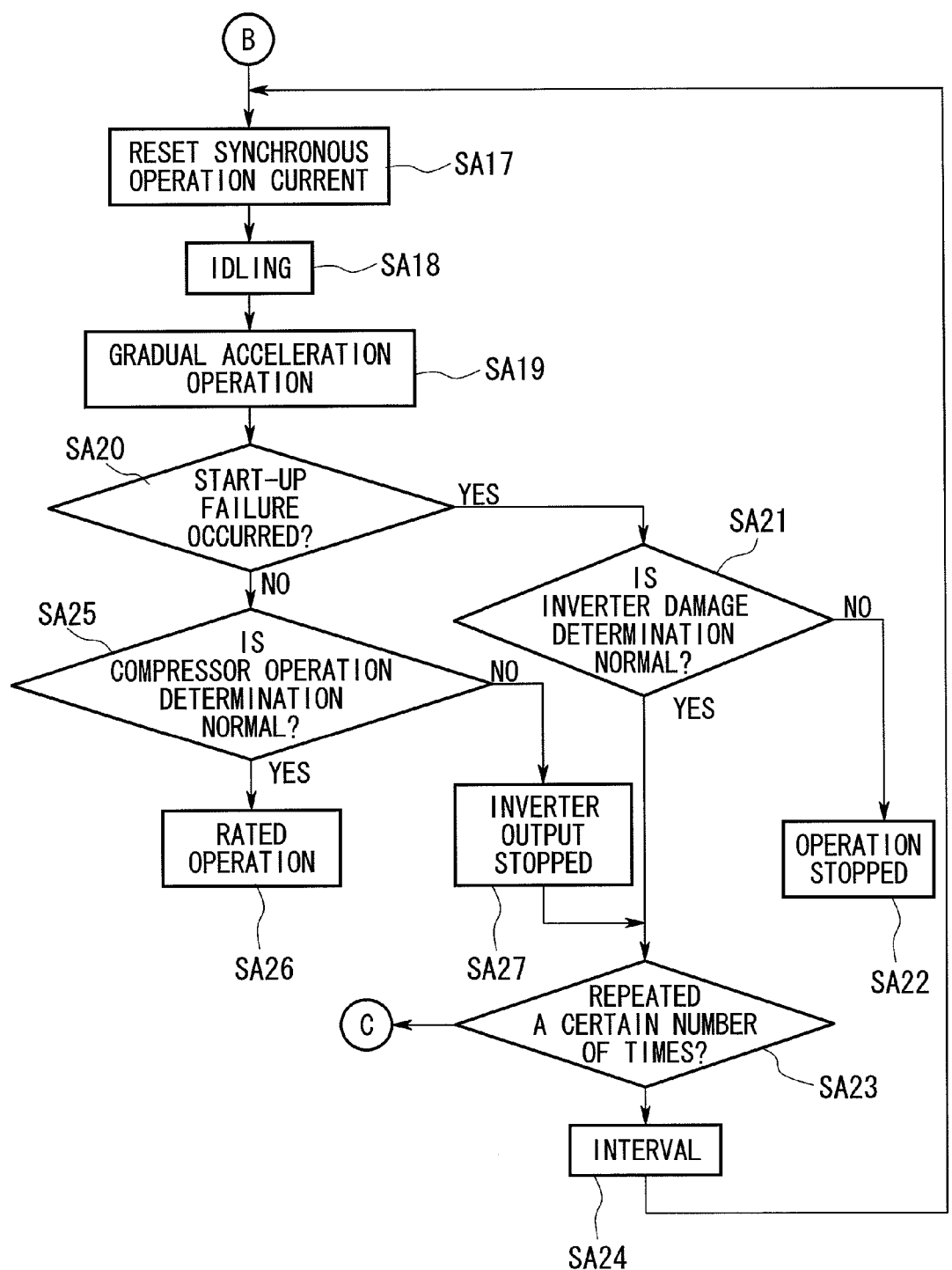
[FIG. 7]

When it is determined in Step SA16 in FIG. 6B that it has been repeated the predetermined number of times, the process goes to Step SA17 in FIG. 7.

In Step SA17 in FIG. 7, the synchronous operation current is reset. In this reset processing of the synchronous operation current, processing identical to the processing of the above-described Steps SA1 to SA4 (see FIG. 6A) is carried out. In other words, when the overcurrent determining value Th exceeds the synchronous operation limiting current TDBmax, the synchronous operation limiting current TDBmax is set as the synchronous operation current TDB. In contrast, when the overcurrent determining value Th is smaller than or equal to the synchronous operation limiting current TDBmax, the overcurrent determining value Th is set as the synchronous operation current TDB. In this way, when the synchronous operation current is reset, subsequently, idling operation of the motor is carried out (Step SA18). Idling operation is for discharging the liquid refrigerant in the compressor 8, and rotation is carried out at a constant low rotational speed for a predetermined amount of time (for example, approximately several seconds to several tens of seconds).

When the idling operation is completed, subsequently, the motor is rotated at a gradual angular acceleration (Step SA19). For example, the motor is rotated at an angular acceleration of 720 rpm/s. In this way, low speed start-up that is the same as normal start-up control is achieved. Subsequently, it is determined whether or not start-up failure has occurred (Step SA20) in the same manner as in the above-described Step SA8 (see FIG. 6B). If, as a result, there are no abnormalities, subsequently, inverter damage is determined (Step SA21). If, as a result, when inverter damage has occurred, the operation is stopped (Step SA22). In contrast, if inverter damage has not occurred, it is determined whether or not the processing of Steps SA17 to SA21 has been repeated a certain number of times (Step SA23).

In Step SA23, if the processing of Steps SA17 to SA21 has not been repeated a certain number of times, the processing enters stand-by for a predetermined amount of time (Step SA24) and then returns to the above-described Step SA17 to reset the synchronous operation current. In contrast, if it is determined in Step SA23 that it has been repeated a certain number of times, the processing returns to Step SA1 shown in FIG. 6A.

When it is determined in Step SA20 in FIG. 7 that start-up failure has not occurred, it is determined whether or not the compressor operation is normal (Step SA25). If, as a result, it is normal, the operation is shifted to steady operation (Step SA26), and if it is not normal, the operation is shifted to the above-described Step SA23 after stopping the inverter output (Step SA27).

As described above, with the control device of the permanent-magnet type synchronous motor according to this embodiment, the synchronous operation current at start-up is set in response to the current limiting value determined from the temperature of the inverter 2 supplying a 3-phase current to the permanent-magnet type synchronous motor; therefore, an overcurrent can be prevented from being applied to the inverter at start-up. By setting the synchronous operation current to a current having a value as close as possible to the current limiting value, the start-up success rate of the permanent-magnet type synchronous motor can be increased. In this case, as the current limiting value, the current limiting value is determined on the basis of the temperature characteristics of the power transistors 4a to 4f, which are the main components of the inverter 2. In this way, it is possible to prevent deterioration and damage of the power transistors 4a to 4f due to an overcurrent.

Furthermore, after start-up the output voltage or the output current of the inverter during the rotation stabilizing period is monitored; therefore, these values can be used to estimate the motor loads. Then, by updating the synchronous operation current to a suitable current value taking into consideration these motor loads, it is possible to reduce the power consumption and realize efficient motor driving.

Furthermore, according to the above-described configuration, so long as the configuration is capable of acquiring the temperature of the inverter, it is possible to set the synchronous operation current at start-up; therefore, there is no need to acquire sensor information from the motor, the compressor, and so on. In this way, the device configuration can be simplified.

In this embodiment, in Step SA7, the synchronous operation current is constantly updated. However, for example, in Step SA3, when the overcurrent determining value Th is smaller than or equal to the synchronous operation limiting current TDBmax, and, in Step SA4, when the overcurrent determining value Th is set as the synchronous operation current, the updating of the synchronous operation current in Step SA7 need not be carried out, and, subsequently, the synchronous operation current set in Step SA4 may be maintained.

Moreover, for updating the synchronous operation current, instead of a method of updating the synchronous operation current on the basis of the above-described γ axis terminal voltage Vγ, the synchronous operation current may be determined on the basis of one of the voltage values of the 3-phase output voltages of the inverter 2, or the synchronous operation current may be determined on the basis of the output current of the inverter 2, instead of a voltage.

Second Embodiment

Next, a control device of a permanent-magnet type synchronous motor according to a second embodiment of the present invention will be described with reference to the drawings.

The device configuration of the control device according to the second embodiment is basically the same as the device configuration of the control device 3 according to the first embodiment. However, the type of control performed by the voltage-command computing unit 11 differs. Specifically, liquid compression determination (see Step SB7 in FIG. 9A) for determining whether or not the refrigerant in the compressor 8 is liquefied after the motor is started up is further provided.

Figure 9A:
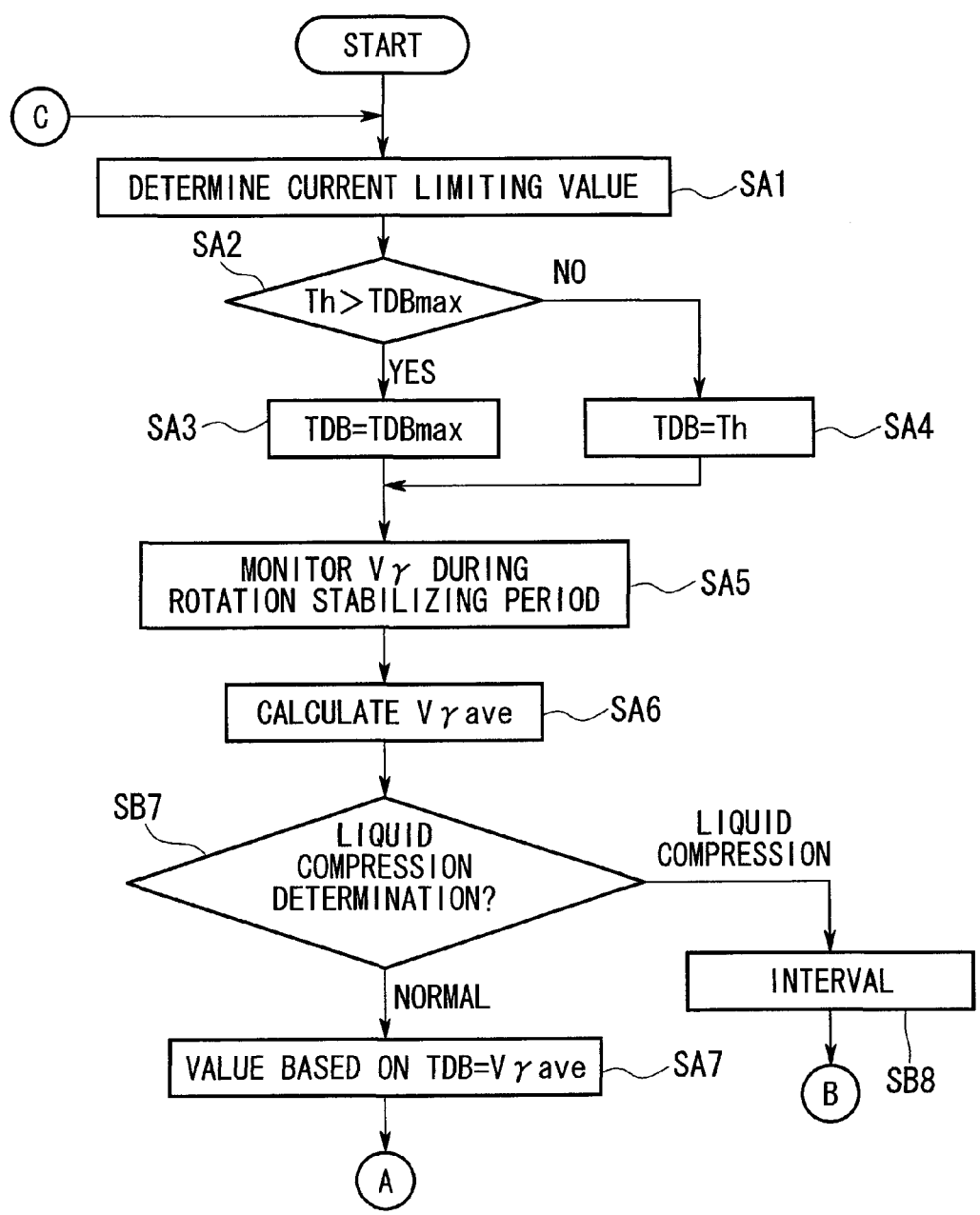
[FIG. 9A]
Figure 9B:
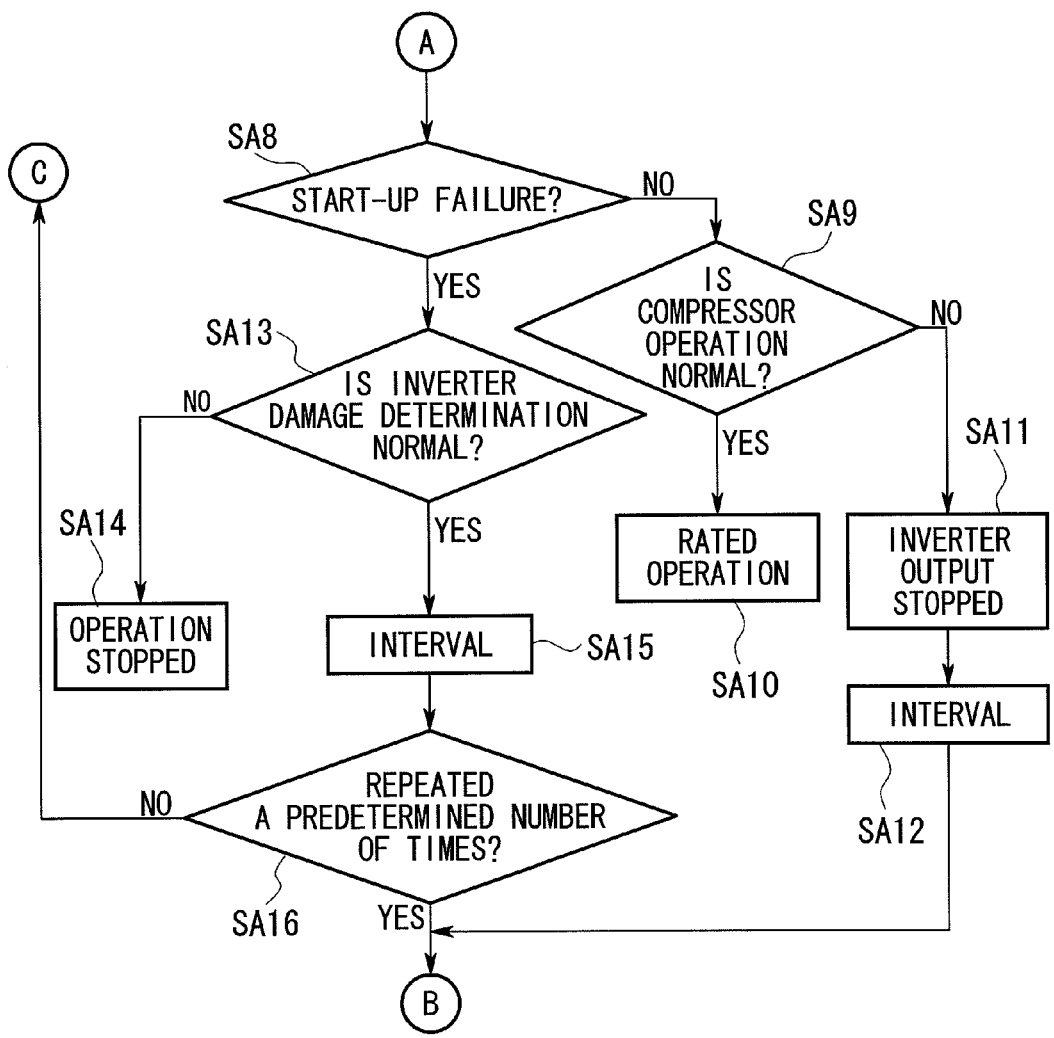

The control carried out at the voltage-command computing unit 11 according to this embodiment will be described below with reference to FIGS. 9A and 9B. FIGS. 9A and 9B are flow charts illustrating the control procedure at start-up of the permanent-magnet type synchronous motor according to the second embodiment of the present invention. In FIGS. 9A and 9B, the processing details that are the same as those in FIGS. 6A to 7 are represented by the same Step number, and descriptions thereof are omitted.

The synchronous operation current TDB is set by carrying out Steps SA1 to SA4, and operation of the motor 7 based on this synchronous operation current TDB is started. Then, in Step SA5, the γ axis terminal voltage Vγ of the inverter 2 during the rotation stabilizing period is monitored, and in Step SA6, the average value Vγave of the γ axis terminal voltages Vγ during the rotation stabilizing period is calculated. Subsequently, in Step SB7, liquid compression determination, which is characteristic of this embodiment, is carried out.

In liquid compression determination, it is determined whether or not an unexpected amount of torque due to liquefaction of the refrigerant in the compressor 8 is required for compression. Specifically, the average value Vγave of the γ axis terminal voltages Vγ calculated in Step SA6 is defined as a liquefaction determining value L (=Vγave) for determining whether or not liquefaction has occurred.

Then, it is determined whether or not liquefaction has occurred by determining whether or not this liquefaction determining value L exceeds a predetermined liquefaction reference value Lref. Here, the liquefaction reference value Lref is a value that is empirically set; for example, by determining the relationship between the liquefaction determining value L and the liquefaction of the refrigerant through experiment, etc., and setting the critical value of liquefaction to the liquefaction reference value Lref, it is possible to accurately determine whether or not the refrigerant has liquefied.

Then, in the above-described Step SB7, when the liquefaction determining value L exceeds the liquefaction reference value Lref, it is determined that liquefaction has not occurred, i.e., the refrigerant in the compressor 8 is not liquefied, and the process goes to Step SA13 in FIG. 9B, subsequently proceeding with the processing according to the processing procedure of the above-described first embodiment.

In contrast, in Step SB7, when the liquefaction determining value L is smaller than or equal to the liquefaction reference value Lref, it is determined that liquefaction has occurred, i.e., the refrigerant in the compressor 8 is liquefied, and the process goes to Step SB8 where the process enters stand-by for a predetermined period of time. In this way, by entering stand-by for a predetermined period of time, the refrigerant in the compressor is left to stabilize.

Next, the process goes to Step SA17 shown in FIG. 7 to carry out idling operation of the motor (Step SA18 in FIG. 7) in order to reset the synchronous operation current on the basis of the current temperature of the inverter 2 and then discharge the liquid refrigerant. When the idling operation is ended, operation of the motor is carried out at gradual angular acceleration (Step SA19), subsequently proceeding with the processing according to the processing procedure of the above-described first embodiment.

As described above, in the control device of the permanent-magnet type synchronous motor according to this embodiment, after start-up, the liquefaction determining value L for determining whether or not the refrigerant in the compressor is liquefied is calculated from the output voltage of the inverter during the rotation stabilizing period, and whether or not liquid compression occurs is determined on the basis of whether or not this liquefaction determining value L exceeds the liquefaction reference value Lref. Then, when it is determined that liquefaction has occurred, suitable operation control corresponding to liquefaction is carried out; therefore, even when liquefaction occurs, the motor can be started smoothly.

In the above, the embodiments of the present invention have been described in detail with reference to the drawings. However, specific configurations are not limited to the embodiments, and design modifications etc. within the scope of the present invention may be made.

For example, with the control device of the permanent-magnet type synchronous motor according to the present invention, during normal operation, the torque of the permanent-magnet type synchronous motor is controlled with a minimum current, taking into consideration the reluctance torque of the permanent-magnet type synchronous motor. Instead of such a control method, however, a configuration that carries out known control of the permanent-magnet type synchronous motor that is normally carried out, i.e., control in which the power factor equals one, may be employed.

In the above-described embodiments, a case in which the control device is constructed of a computer system is presumed. However, the configuration is not limited thereto. For example, each unit can be constructed of separate hardware.

The invention claimed is:

1. A control device of a permanent-magnet type synchronous motor used as a driving source of a compressor of a vehicle air conditioner, comprising:
   a current setting unit configured to set a synchronous operation current at start-up in response to a current limiting value determined from the temperature of an inverter that supplies three-phase power to the permanent-magnet type synchronous motor; and
   a current updating unit configured to monitor an output voltage or an output current of the inverter during a rotation stabilizing period after start-up and to update the synchronous operation current using this output voltage or output current.

2. The control device of a permanent-magnet type synchronous motor according to claim 1, wherein the current setting unit determines the current limiting value in response to a temperature characteristic of a switching device included in the inverter.

3. The control device of a permanent-magnet type synchronous motor according to claim 1, further comprising:
   a computing unit configured to compute a liquefaction determining value for determining whether or not a refrigerant in the compressor is liquefied, using the output voltage or output current of the inverter during the rotation stabilizing period; and
   a determining unit configured to determine whether or not the liquefaction determining value exceeds a liquefaction reference value,
   wherein the current updating unit carries out updating of the synchronous operation current when the liquefaction determining value does not exceed the liquefaction reference value.

4. A control method of a permanent-magnet type synchronous motor used as a driving source of a compressor of a vehicle air conditioner, comprising:
   a current setting step of setting a synchronous operation current at start-up in response to a current limiting value determined from the temperature of an inverter that supplies three-phase power to the permanent-magnet type synchronous motor; and
   a current updating step of monitoring an output voltage or an output current of the inverter during a rotation stabilizing period after start-up and updating the synchronous operation current using this output voltage or output current.

5. The control method of a permanent-magnet type synchronous motor according to claim 4, wherein, in the current setting step, the current limiting value is determined in response to a temperature characteristic of a switching device included in the inverter.

6. The control method of a permanent-magnet type synchronous motor according to claim 4, further comprising:
   a computing step of computing a liquefaction determining value for determining whether or not a refrigerant in the compressor is liquefied, using the output voltage or output current of the inverter during the rotation stabilizing period; and
   a determining step of determining whether or not the liquefaction determining value exceeds a liquefaction reference value,
   wherein, in the current updating step, updating of the synchronous operation current is carried out when the liquefaction determining value does not exceed the liquefaction reference value.

7. A non-transitory computer-readable medium having stored thereon a control program for controlling a permanent-magnet type synchronous motor used as a driving source of a compressor of a vehicle air conditioner, the control program configured to cause a computer to execute:
   current setting processing for setting a synchronous operation current at start-up in response to a current limiting value determined from the temperature of an inverter that supplies three-phase power to the permanent-magnet type synchronous motor; and
   current updating processing for monitoring an output voltage or an output current of the inverter during a rotation stabilizing period after start-up and updating the synchronous operation current using this output voltage or output current.

8. The non-transitory computer-readable medium according to claim 7, wherein the current setting processing configured to determine the current limiting value in response to a temperature characteristic of a switching device included in the inverter.

9. The non-transitory computer-readable medium according to claim 7, further comprising:
   computing processing for computing a liquefaction determining value for determining whether or not a refrigerant in the compressor is liquefied, using the output voltage or output current of the inverter during the rotation stabilizing period; and
   determining processing for determining whether or not the liquefaction determining value exceeds a liquefaction reference value,
   wherein the current updating processing is configured to update the synchronous operation current when the liquefaction determining value does not exceed the liquefaction reference value.

* * * * *